(12) United States Patent
Bromham et al.

(10) Patent No.: US 9,644,555 B2
(45) Date of Patent: May 9, 2017

(54) METHOD OF PRE-EMPTIVELY REGENERATING A LEAN NOX TRAP

(71) Applicant: Ford Global Technologies, LLC, Dearborn, MI (US)

(72) Inventors: Jim Bromham, Trowbridge (GB); Frederik De Smet, Genk (BE); Kim Ford, Basildon (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/927,203

(22) Filed: Oct. 29, 2015

(65) Prior Publication Data

US 2016/0123260 A1    May 5, 2016

(30) Foreign Application Priority Data

Nov. 5, 2014   (GB) .................................. 1419682.8

(51) Int. Cl.
*F01N 3/00* (2006.01)
*F02D 41/02* (2006.01)
(Continued)

(52) U.S. Cl.
CPC ....... *F02D 41/0275* (2013.01); *F01N 3/0842* (2013.01); *F01N 9/00* (2013.01); *F02D 41/1447* (2013.01); *F02D 41/1458* (2013.01); *F01N 3/0885* (2013.01); *F01N 2430/06* (2013.01); *F01N 2900/0412* (2013.01); *F01N 2900/0418* (2013.01); *F01N 2900/08* (2013.01); *F01N 2900/10* (2013.01); *F01N 2900/12* (2013.01); *F01N 2900/1404* (2013.01); *F01N 2900/1411* (2013.01); *F01N 2900/1614* (2013.01); *F02D 2200/0806* (2013.01);
(Continued)

(58) Field of Classification Search
USPC .......................... 60/274, 276, 295, 297, 301
See application file for complete search history.

(56) References Cited

U.S. PATENT DOCUMENTS 5,771,685 A * 6/1998 Hepburn ............ B01D 53/8696
                                                          60/274
5,829,885 A    11/1998 Scheich
(Continued)

FOREIGN PATENT DOCUMENTS

GB        2393404 A     3/2004
GB        2424197 A     9/2006
(Continued)

OTHER PUBLICATIONS

Bromham, Jim et al., "Method of Predicting the Future Operation of a Vehicle," U.S. Appl. No. 14/930,249, filed Nov. 2, 2015, 29 pages.
(Continued)

*Primary Examiner* — Binh Q Tran
(74) *Attorney, Agent, or Firm* — Julia Voutyras; McCoy Russell LLP

(57) ABSTRACT

A method of predicting the future use of a vehicle or an engine of the vehicle is used to evaluate whether NOx slippage from a lean NOx trap is likely to occur during a current drive cycle and also for scheduling when favorable conditions are likely to exist to purge the lean NOx trap before the slippage of NOx from the lean NOx trap is expected to occur.

20 Claims, 5 Drawing Sheets

(51) Int. Cl.
*F01N 3/08* (2006.01)
*F01N 9/00* (2006.01)
*F02D 41/14* (2006.01)

(52) U.S. Cl.
CPC ......... *F02D 2200/701* (2013.01); *Y02T 10/24* (2013.01); *Y02T 10/47* (2013.01)

(56) References Cited

U.S. PATENT DOCUMENTS

| | | | |
|---|---|---|---|
| 6,477,834 B1 * | 11/2002 | Asanuma | F01N 3/0842 60/285 |
| 6,925,797 B2 * | 8/2005 | Taga | F01N 3/0842 60/276 |
| 7,685,813 B2 | 3/2010 | McCarthy, Jr. | |
| 8,109,080 B2 * | 2/2012 | Gabe | B01D 53/9409 60/276 |
| 9,297,287 B2 * | 3/2016 | Hirota | F01N 3/208 |
| 2003/0093988 A1 | 5/2003 | Surnilla et al. | |
| 2009/0183551 A1 | 7/2009 | Fattic et al. | |

FOREIGN PATENT DOCUMENTS

| | | |
|---|---|---|
| JP | 2007270646 A | 10/2007 |
| WO | 2006131825 A1 | 12/2006 |

OTHER PUBLICATIONS

Intellectual Property Office, Combined Search and Examination Report of GB1419682.8, Jan. 15, 2015, Great Britain, 5 pages.

* cited by examiner

METHOD OF PRE-EMPTIVELY REGENERATING A LEAN NOX TRAP

CROSS REFERENCE TO RELATED APPLICATION

The present application claims priority to Great Britain Patent Application No. 1419682.8, filed Nov. 5, 2014, the entire contents of which are hereby incorporated by reference for all purposes.

FIELD

This invention relates to the regeneration of a lean NOx trap for an engine of a road vehicle and in particular to a method and apparatus for improving the purging of NOx from the lean NOx trap (LNT) during operation of the road vehicle.

BACKGROUND AND SUMMARY

A LNT is an exhaust after-treatment device for lean burn engines. The LNT has to be purged periodically to release and convert the oxides of nitrogen (NOX) stored in the LNT during lean operation of the engine. To accomplish the purge, the engine has to be operated at an air-to-fuel ratio that is rich of stoichiometric. As a result of the rich operation, substantial amounts of carbon monoxide (CO) and hydrocarbons (HC) are generated to convert the stored NOX. Typically, the purge mode is activated on the basis of estimated LNT loading. That is, when the estimated mass of NOX stored in the LNT exceeds a predetermined threshold, a transition to the purge mode is initiated. The rich operation will be continued for several seconds until the LNT is emptied of the stored NOX, whereupon the purge mode is terminated and the normal lean operation of the engine is resumed. The ending of the purge is normally initiated by a transition in the reading of an Oxygen sensor such as a HEGO sensor or NOx sensor located downstream of the LNT or is based on a modelled prediction of the LNT state. Since the engine has to be operated rich of stoichiometric during the purge operation, purging will have a significant negative effect on fuel economy compared to the fuel economy advantage of lean operation and so it is desirable to optimize the timing of the purge in order to reduce the loss in fuel economy.

It is well known that the regeneration of a LNT after-treatment device can be more efficiently carried out when the vehicle is being operated in a particular manner such as at a high load because the fuel penalty is then reduced.

It is further known that when a LNT fills with NOx there is an increased risk of NOx slippage from the LNT. NOx slippage from an LNT will result in increased emissions from the vehicle and so is undesirable.

It has been proposed in, for example U.S. Pat. No. 7,685,813 to predict the future usage of a vehicle by using a navigation system. The navigation system, such as a GPS system, is used to predict the future route from which the expected usage of the vehicle while it is traversing that route can be derived which can be useful in deciding when good conditions exist for purging the LNT. However, the use of a navigation system to predict the future usage or operation of a vehicle cannot be used in all cases because not all vehicles are fitted with such navigation equipment.

The inventors have realized that by using knowledge of the future operation of a vehicle the regeneration of the LNT can be scheduled to occur when the engine of the vehicle is expected to be operating in a predefined manner that is suitable for the purging of NOx from the LNT. The inventors have further realized that by using knowledge of the future operation of a vehicle it is possible to purge the LNT before the vehicle is operated in a manner likely to produce NOx slippage from the LNT thereby eliminating or significantly reducing the risk of NOx slippage from the LNT.

It is an object of the invention to provide a method of pre-emptively regenerating a lean NOx trap arranged to receive exhaust gas from a lean burn engine of a vehicle that is cost effective to implement and reduces the risk of NOx slippage occurring.

According to a first aspect of the invention there is provided a method of pre-emptively regenerating a lean NOx trap arranged to receive exhaust gas from a lean burn engine of a vehicle the method comprising using a prediction of future operation of the vehicle to estimate the probability of NOx slippage from the lean NOx trap during the current drive cycle, and, if NOx slippage is expected to occur in the current drive cycle, use the prediction of future operation of the vehicle to infer whether there are any forthcoming opportunities to regenerate the lean NOx trap in a favorable manner before the slippage is predicted to occur and, if such favorable opportunities exist, schedule a regeneration of the lean NOx trap for the next favorable opportunity.

The probability of whether NOx slippage is likely to occur may be based upon the current level of NOx stored in the lean NOx trap and at least one engine operational factor.

The probability of whether NOx slippage is likely to occur may be based upon at least two engine operational factors.

One engine operational factor may be an expected drop in air/fuel ratio.

One engine operational factor may be an expected increase in exhaust gas temperature.

One engine operational factor may be an expected significant change in exhaust gas mass flow to the lean NOx trap.

Regeneration of the lean NOX trap in a favorable manner may be scheduled to occur when the prediction indicates that the engine is expected to be operating with a low air/fuel ratio.

The engine may be expected to be operating with a low air/fuel ratio when the load on the engine is high.

The engine may be expected to be operating with a low air/fuel ratio when the load on the engine is high and the speed of the engine is low.

The prediction of future operation of the vehicle may be obtained using a common route predictor method.

The common route predictor method may comprise the steps of comparing a current pattern of operation with stored common patterns of operation and, if the current pattern of operation conforms to a particular one of the stored common patterns of operation, using the particular one of the stored common patterns of operation for predicting the future operation of the vehicle during the current trip.

The common route predictor method may further comprise monitoring the operation of the vehicle for each trip conducted by the user, storing data collected from the monitoring and establishing the common patterns of operation from the stored data.

According to a second aspect of the invention there is provided a vehicle having a lean burn engine, a lean NOx trap arranged to receive exhaust gas from the engine and an electronic processing system to control regeneration of the lean NOx trap wherein the electronic processing system is operable to use a prediction of future operation of the vehicle to estimate the probability of NOx slippage from the lean NOx trap during the current drive cycle, and, if NOx slippage is expected to occur in the current drive cycle, use the prediction of future operation of the vehicle to infer whether there are any forthcoming opportunities to regenerate the lean NOx trap in a favorable manner before the slippage is predicted to occur and, if such favorable opportunities exist, schedule a regeneration of the lean NOx trap for the next favorable opportunity.

The electronic processing system may be further operable to produce the prediction of future operation of the vehicle.

The prediction of future operation of the vehicle may be obtained using a common route predictor method.

The common route predictor method may be performed using the electronic processing system and may comprise the steps of comparing a current pattern of operation with stored common patterns of operation and, if the current pattern of operation conforms to a particular one of the stored common patterns of operation, using the particular one of the stored common patterns of operation for predicting the future operation of the vehicle during the current trip.

The common route predictor method may further comprise monitoring the operation of the vehicle for each trip conducted by the user, storing data collected from the monitoring and establishing the common patterns of operation from the stored data.

The invention will now be described by way of example with reference to the accompanying drawings.

DETAILED DESCRIPTION

Figure 1:
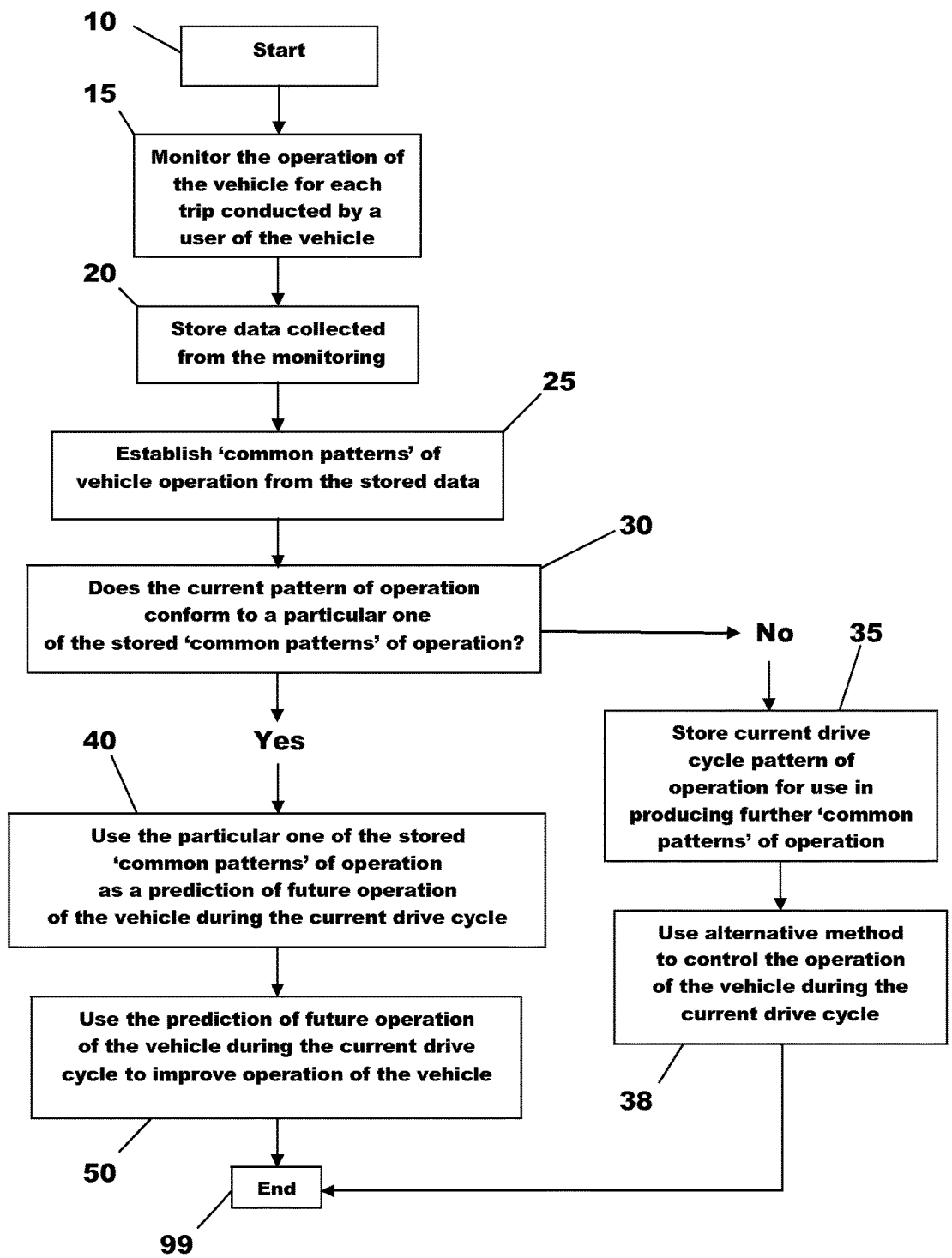
FIG. 1 is a high level flow chart of a method of predicting the future usage of a vehicle.
Figure 3:
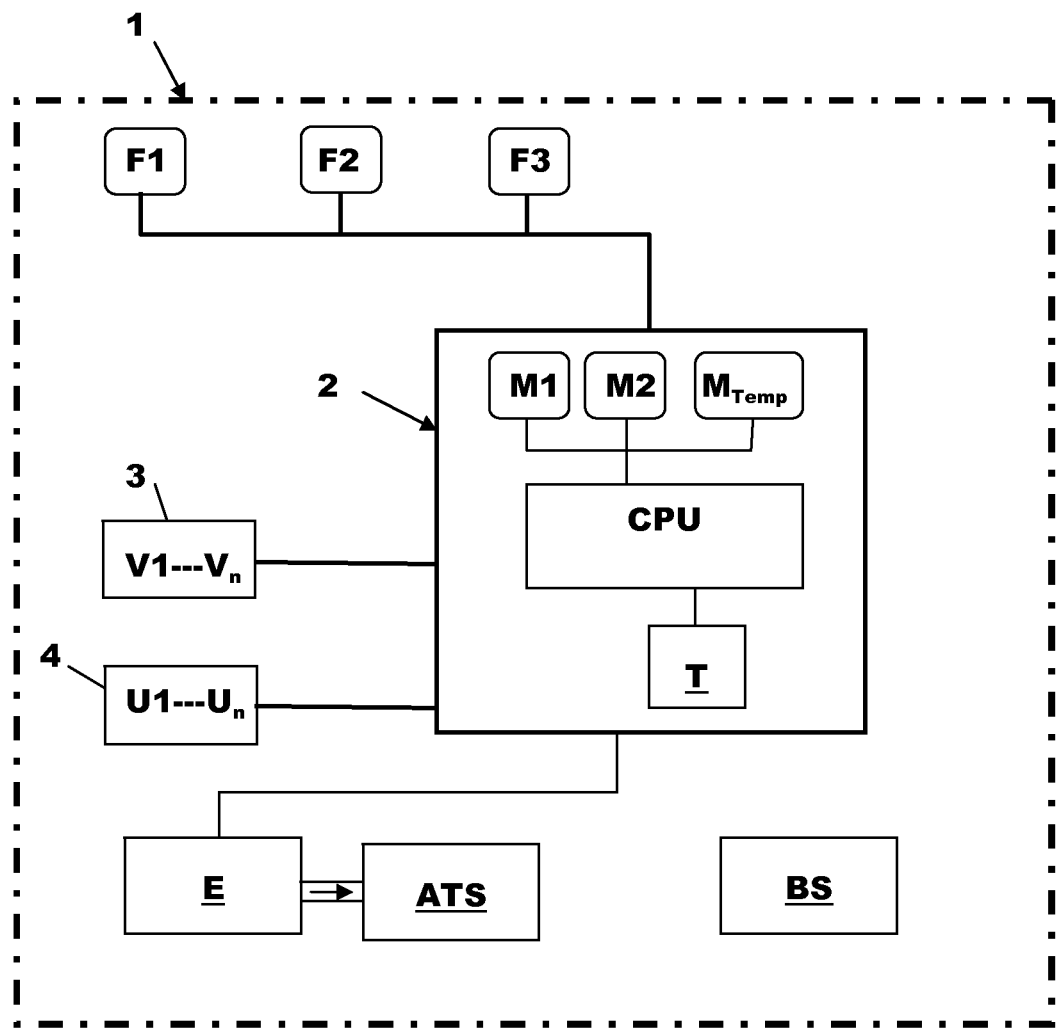
FIG. 3 is a block diagram of a vehicle having a system to predict the future operation of the vehicle in accordance with a second aspect of the invention.

With particular reference to FIG. 1 there is shown a method for predicting the future operation of a vehicle such as the vehicle 1 shown in FIG. 3.

The method starts in box 10 and then advances to box 15 where the operation of the vehicle is monitored for each trip conducted by a user of the vehicle. The various parameters monitored are those useful for both recognizing that a particular route is being followed and for use in determining when optimization of the operation of the vehicle can be made at a later point in the current trip.

A trip as meant herein is a single drive cycle. A drive cycle can comprise a period starting with a key-on event and ending with a key-off event or starting when the vehicle moves in a forward direction following a key-on event and ending when the vehicle halts followed by a key-off event.

The parameters monitored can be divided into:
vehicle parameters such as, for example and without limitation, engine speed, vehicle speed, engine torque, gear ratio; and
user input parameters such as, for example and without limitation, accelerator pedal position, accelerator pedal rate of change, brake pedal position, gear selector position, steering wheel rotational position, and steering wheel position rate of change.

These parameters are referenced against either a timeline for a trip such as, the time that has elapsed since a key-on event occurred, the time that has elapsed since an initial movement of the vehicle is sensed to have occurred following a key-on event or against a measurement of distance travelled such as the distance travelled by the vehicle following a key-on event.

From box 15 the method advances to box 20 where the information collected from the monitoring is stored in a memory. It will be appreciated that the information is stored in real time and so the operations referred to in boxes 15 and 20 are running concurrently. It will be appreciated that the information collected by the monitoring could be stored as a continuous record of the parameter during the entire drive cycle or could be stored snap shots of the parameter stored when a predefined key event occurs. For example and without limitation, whenever a gear change occurs all of the parameters could be recorded for a predefined period of time following the gear change.

The method advances from box 20 to box 25 where 'common patterns' of vehicle operation are established. Most drivers have a number of routes that they use frequently follow and these routes are referred to herein as "common routes". For example and without limitation, the route from home to work, the route from work to home, the route from home to a supermarket, the route from home to the school of a child, the route from home to a sports venue such as a gym, swimming pool, golf club, football club and many other regularly followed routes.

When driving along such a common route the vehicle will operate in a similar manner every time it follows the route and characteristic vehicle behaviour will result that if recorded and recognized can be used to predict the future operation of the vehicle.

For example and without limitation, if on the route to work the vehicle has to negotiate a roundabout (rotary junction) after approximately two minutes from initial take-off from rest followed by acceleration onto a motorway then the resulting combination of the vehicle parameter and the user parameter are used to identify the route that the vehicle is currently following.

Therefore by analyzing the stored data from previous trips a library of common routes can be built up. For example and without limitation, if characteristic operational features of a route occur more than a predefined number of times within a predefined period of time, the route can be classified as a common route. For example, if the previously referred to combination of vehicle and driver input parameters occurs five times over a four week period or for five times in 20 drive cycles, then that particular pattern of parameters is stored as a common route. Otherwise it is kept for future reference because it may become a common route when the next drive cycle occurs.

As an alternative when a route is driven at least once it is added to the library of common routes and the library of common routes are sorted based upon their frequency of use with routes not repeated in a predefined time period being deleted.

From box 25 the method advances to box 30 where the currently being driven route is compared to the common routes stored in the library and if one or more characteristic combinations of parameters that has occurred in the current drive cycle is found to be present in one of the common routes then it is assumed that the vehicle is following that particular common route and the method advances to box 40 where the stored common route is used to predict the future operation of the vehicle. For example, if after one minute from initial take-off following a key-on event or 0.5 Km from the origin of travel for the current trip it has been established that the vehicle is following a particular one of the stored common routes in box 30 then in box 40 a prediction of future vehicle operation for the remaining part of the route can be predicted.

This information can then be used in box 50 to improve the operation of the vehicle for the rest of the current drive cycle or for a short predefined period of time following the current point in time depending upon the operation of the vehicle that is to be improved.

It will be appreciated that, if the vehicle 1 deviates from the common route, the use of the future prediction provided in box 50 is not possible and so the regeneration will need to be controlled in some other manner. In such a case the method could jump from box 50 to box 38.

However, normally, the method advances from box 50 to box 99 where it ends when a key-off event occurs.

Referring back to box 30, if the current pattern of operation does not conform to one of the stored common routes then the method branches to box 35 where operational characteristics for the current route are stored. It will be appreciated that it is only through usage of the vehicle that the common routes can be defined and that when the vehicle is new no common routes will be present and when the vehicle is transferred to a new owner the common routes will no longer be valid. Therefore during the period where common routes are being defined and during all usage of the vehicle each route is stored and analysed to see if it can be defined as a common route.

From box 35 the method advances to box 38 where an alternative method for controlling the vehicle during the current drive cycle must be used because there is no available prediction of the future operation available although expected routes based upon standard data could be used. However, the vehicle has to be operated without the benefit of an actual prediction of future operation of the vehicle for the current trip.

As before, the method ends at box 99 when a key-off event occurs.

It will be appreciated that the parameters used to identify whether a vehicle is following a common route and hence the parameters used to define the characteristics of the common route need not be the same as the parameters of which knowledge is required in order to improve a particular function of the vehicle. For example, a comparison of steering wheel position verses time or distance travelled and gear ratio versus time or distance travelled could be used to establish correlation between a current route and one of the stored common routes but the information required in the future could be vehicle speed and accelerator pedal position which are also saved but are not used to establish whether the current route is a common route. For example and without limitation, by using steering wheel position and gear ratio it can be established that the vehicle is currently on a common route and locate where on the common route the vehicle is located. Using this information the vehicle speed and accelerator pedal position can be analysed for the predicted future operation of the vehicle for the current trip so as to locate a point in time or distance from the origin of travel where the vehicle is expected to decelerate for a significant period of time with the accelerator pedal not being applied for use in scheduling a recharging of a battery of the vehicle by converting the kinetic energy of the vehicle into electrical energy.

A method using stored common routes to predict future operation of a vehicle is referred to hereinafter as a common route predictor method (CRPM).

Figure 2A:
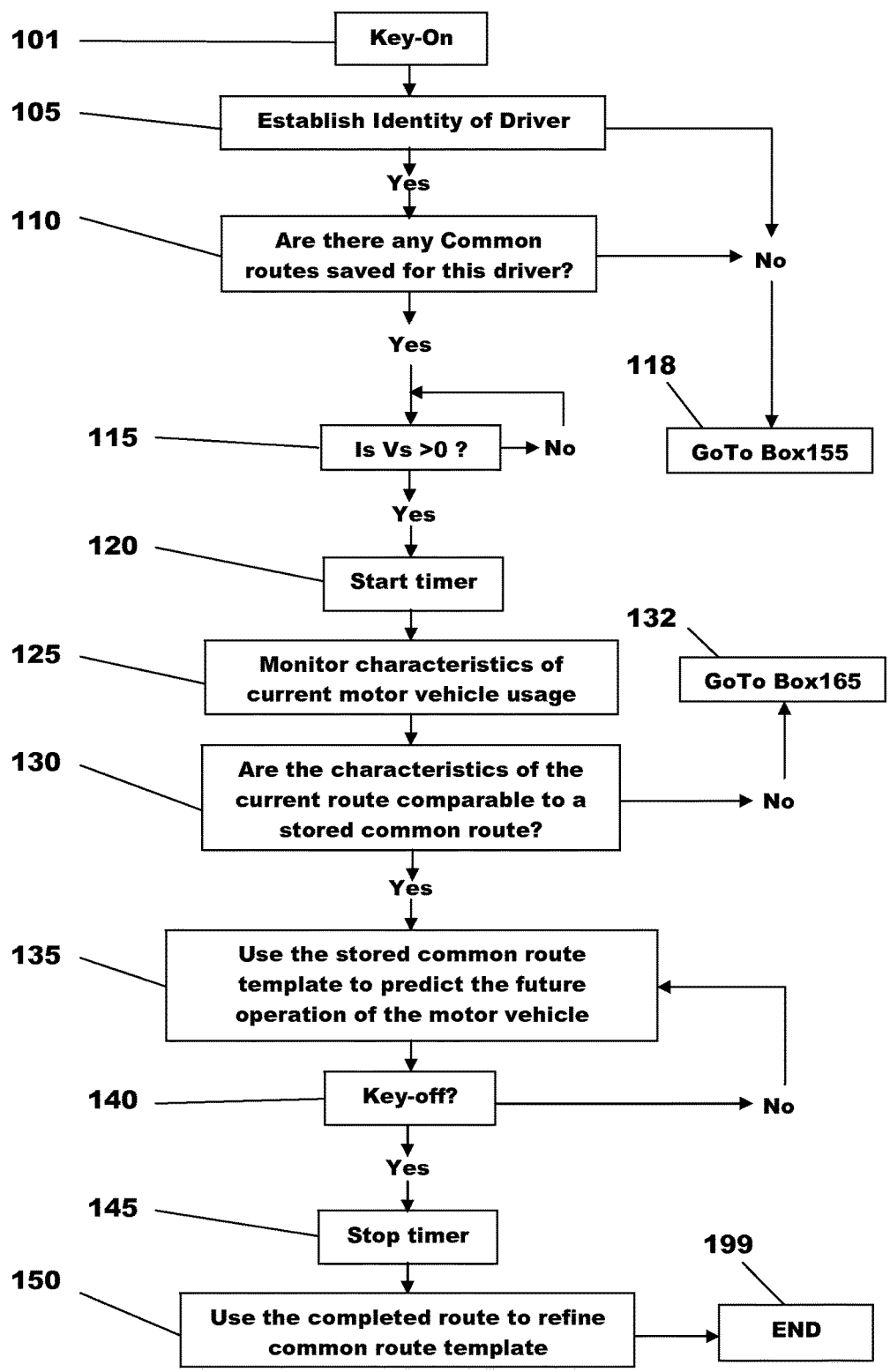
FIGS. 2A and 2B are a flow chart of one exemplary use of a method of predicting the future usage of a vehicle as applied to a vehicle having multiple known users.
Figure 2B:
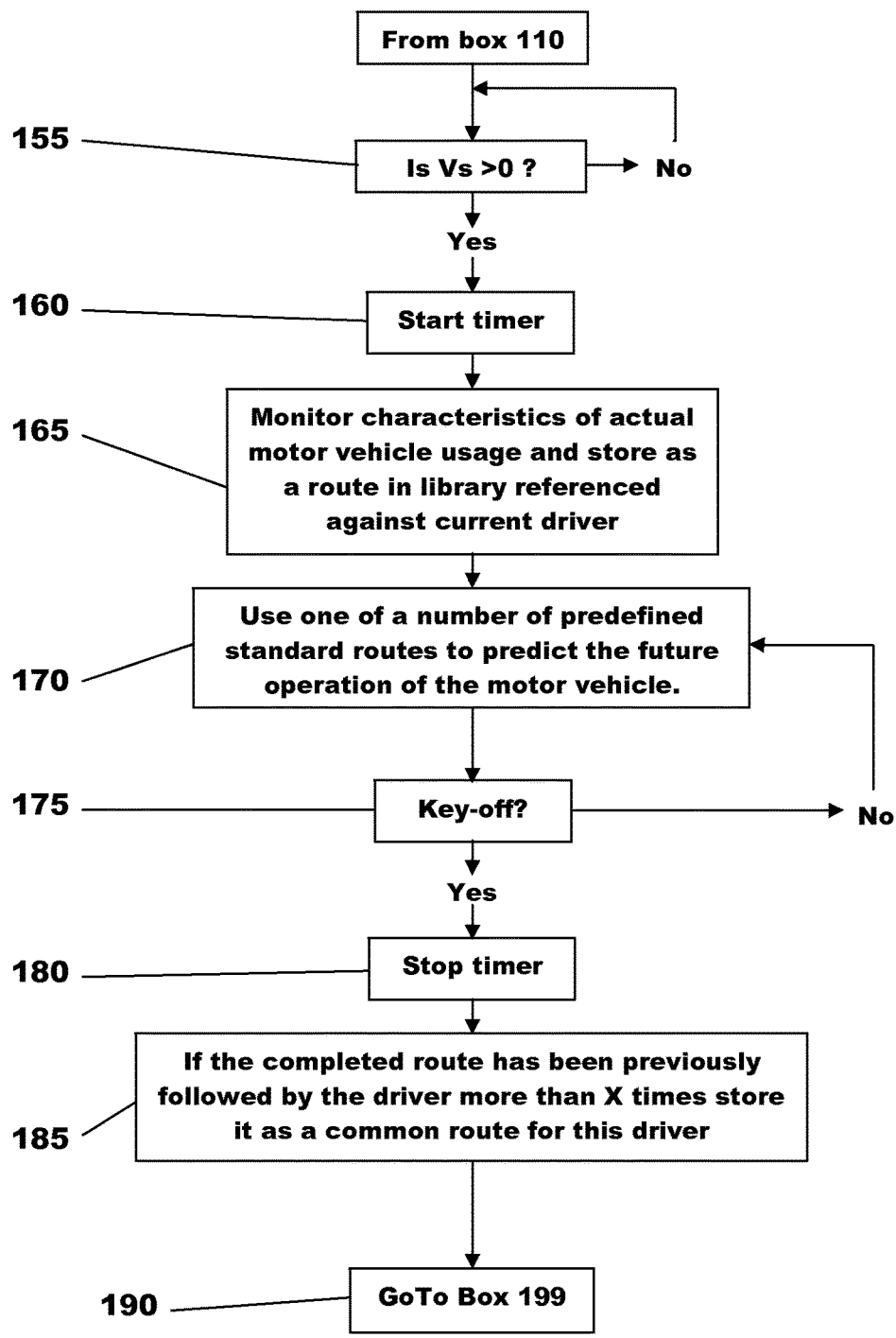

With reference to FIGS. 2A and 2B there is shown one specific embodiment of the use of a CRPM as applied to the vehicle 1 shown in FIG. 3.

The vehicle 1 includes an engine "E", an exhaust aftertreatment system "ATS" for the engine E, a battery system "BS", an electronic processing system (EPS) 2, a vehicle monitor 3 to provide information to the EPS 2 regarding a number of vehicle parameters (V1-$V_n$) such as, for example and without limitation, engine speed, vehicle speed, engine torque, gear ratio and a user monitor 4 to provide information to the EPS 2 regarding a number of user parameters (U1-$U_n$) such as, for example and without limitation, accelerator pedal position, accelerator pedal rate of change, brake pedal position, gear selector position, steering rotational position and steering wheel rate of change.

The vehicle monitor 3 and the user monitor 4 use inputs from sensors that are often already present on a modern vehicle in order to efficiently operate the engine E of the vehicle 1, control exhaust emissions from the engine E of the vehicle 1 or automatically stop and start the engine E of the vehicle 1. For example and without limitation, in the case of the vehicle parameters these can be monitored using an engine speed sensor, a vehicle speed sensor, a sensor indicative of demanded torque, a mass airflow sensor, and other like sensors used to provide signals indicative of the dynamic state of the vehicle or operational parts of the vehicle such as the engine, the gearbox. In the case of the user parameters these can be monitored using an accelerator pedal sensor, a brake pedal sensor, a clutch pedal sensor, a gear selector sensor, a steering wheel rotational position sensor and other like sensors used to provide signals indicative of driver inputs.

It will be appreciated that the actual sensors used will be dependent upon the specific construction of the vehicle used and that it is not necessary for all of the above referred to sensors to be used. Furthermore in some embodiments further sensors not referred to above could alternatively or additionally be used.

The EPS 2 includes a number of memories "M1", "M2", "$M_{Temp}$" a central processing unit "CPU" and a timer "T". It will be appreciated that the EPS 2 is shown schematically and is not intended to represent an actual electronic processing system. The CPU may include instructions stored in non-transitory member for each of the actions of the herein-described methods and flowcharts. The CPU may communicate with sensors coupled in the vehicle to various components as described herein to sense the information described. Further, the CPU may communicate actuation signals to actuators coupled to the various components of the vehicle, engine, and/or exhaust system described herein. Further, the CPU may adjust vehicle, engine, and/or exhaust system operation responsive to the various predictions determined by the CPU to change vehicle operation in real-time while operated by a vehicle user.

Memory M1 is used to store the patterns of vehicle of operation for common routes associated with a first driver and memory M2 is used to store the patterns of vehicle of operation for common routes associated with a second driver.

The memory MTemp is used to store information during a current drive cycle and also patterns of operation from previous drive cycles that have not been classified so far as a common route. The memory MTemp is periodically emptied or purged of store information. For example and without limitation, if a route has not been repeated within a predefined period of time or a predefined number of drive cycles then it is assumed that it is unlikely to become a common route and so does not need to be retained and so is deleted.

The EPS 2 is arranged to improve the operation of one or more operational features of the vehicle 1 and, although three features F1, F2 and F3 are shown, it will be appreciated that more or less features could have their operation improved.

In the case of this example function F1 is the charging of a battery forming part of the battery system BS, F2 is the supply of reductant to an exhaust aftertreatment device forming part of the exhaust aftertreatment system ATS and F3 is the control of the engine E so as to enable regeneration of an exhaust aftertreatment device forming part of the exhaust aftertreatment system ATS. All of these functions have in common that it is advantageous to know what the future usage of the vehicle 1 will be in the current drive cycle so as to enable them to be carried out or performed more efficiently or with less negative environmental effect.

Referring back now to FIG. 2A, the method starts at box 101 with a key-on event and then advances to the box 105. In this case the identity of the user of the vehicle 1 is established by means of a code carried in a key fob (not shown) used to unlock the vehicle 1 and so the identity of vehicle 1 is immediately known upon unlocking of the vehicle 1. However, this need not be the case and the identity of the user could be established based upon the manner in which variations operations are carried out by the user or how features of the vehicle are set for usage by the user. For example and without limitation, the position of the driver's seat, the weight of the driver, the positioning of one or more mirrors, the selection of a particular radio station, the manner of acceleration or deceleration of the vehicle such as aggressive or gradual could all be used to assist with establishing whether the current driver is a known user of the vehicle 1.

Establishing the identity of a user of the vehicle 1 is useful because different users are likely to use different common routes and also because two drivers driving the same route are likely to produce different vehicle operating characteristics and so it is easier to produce a correlation between a currently being driven route and stored common route if the identity of the driver is known. It will be appreciated that if the actual usage of the vehicle is used to identify the user then the positioning of box 105 would need to be later in the sequence of events because the vehicle 1 may need to be moving to establish the identity of the user.

Referring back to box 105 if the identity of the user cannot be established the method branches to box 118 and from there to box 155, the description of which is dealt with later, but, if the identity of the user is established in box 105, then the method advances to box 110 where it is checked whether any common routes exist for the current user. If common routes do exist in the respective memory M1, M2 then the method advances to box 115 but if they do not exist then the method branches to box 118 and from there to box 155, the description of which is dealt with later.

In box 115 it is checked whether the vehicle 1 is moving in a forward direction, if it is not then the method loops back to recheck the speed of the vehicle 1 in box 115 again and if the vehicle 1 is moving in a forward direction the method advances from box 115 to box 120 where a timer such as the timer T is started. The starting of the timer T constitutes the beginning of a drive cycle that will continue until the timer T is stopped in box 145. In other embodiments the start and end points of a drive cycle are based upon key-on and key-off events respectively and the distance the vehicle has moved since the key-on event is used a reference scale.

From box 120 the method advances to box 125 where characteristic parameters of the vehicle 1 during use are monitored. In fact the monitoring of the various characteristic parameters required to build a common route or determine whether the vehicle 1 is driving on a common route will commence as soon as the timer T is started.

From box 125 with the various parameters now being monitored and stored in the temporary memory $M_{Temp}$ the method advances to box 130 to determine whether the route currently being driven conforms to one of the stored common routes for the current user. In this step various characteristic parameters are compared to the same parameters stored as part of the common route for the same elapsed time or for the same distance travelled. For example, a comparison of vehicle parameters such as engine speed, vehicle speed and engine output torque or engine torque demand versus time could be compared to see if the same patterns exist in the current route to one of the stored common routes for the current user.

It will be appreciated that tolerance bands could be applied to these parameters to allow for small differences between the current values and those retained as characteristic of the common route.

Alternatively or in addition to the use of vehicle parameters user parameters could be compared. For example values of steering angle and accelerator pedal position could be compared versus time or gear selector position and clutch or brake pedal position against time could be compared.

By using a combination of both vehicle parameters and user parameters the probability that the result of a positive comparison is correct is increased.

If the result of the comparison in box 130 indicates that none of the currently stored common routes is comparable to the current route then the method branches to box 132 and from there to box 165, the description of which is dealt with later.

However, if a comparable common route is found in memory M1 or M2 depending on the current user of the vehicle 1, the method advances to box 135 where the stored common route is assumed to be an accurate prediction of the future operation of the vehicle 1 for the current drive cycle.

That is to say, values for various vehicle and user parameters can be predicted in the future based upon those values stored as part of the common route and these can be used in decision making processes used to optimize or improve the operation of the functions F1 to F3 that are in the case of this example influenced by the output from the EPS 2.

It will be appreciated that, if the vehicle 1 deviates from the common route, the future prediction provided in box 135 is not possible and so the regeneration will need to be controlled in some other manner. In such a case the method could jump or advance from box 135 to box 170.

However, normally, the method then advances from box 135 to box 140 to check whether a key-off event has occurred and, if it has not, the method returns to box 135 so as to continue using the stored common route as a predictor for future events and this process will continue until the vehicle 1 has reached the final destination for the current drive cycle and a key-off event occurs. Therefore events occurring near to the end of a drive cycle whether they are vehicle parameter events or user parameter events can be predicted as soon as there is confirmation in box 130 that the current route is comparable to a specific one of the stored common routes.

When the end of the current drive cycle occurs as indicated by a key-off event the method will advance from box 140 to box 145 and the timer T is stopped. All of the data for the just completed route is then used to refine the common route template that is to say, any small variations in actual event occurrence compared to those predicted to occur is used to adjust the common route template by, for example varying the tolerances allowable for a positive comparison to be found or by adjusting the predicted values stored in the common route template based upon the newly created record.

The method then ends at box 199.

Referring back now to box 118, the method advances from the box 118 to the box 155 and this transfer will occur because either the identity of the driver cannot be established or there are no stored common routes for the current driver.

In box 155 it is checked whether the vehicle 1 is moving in a forward direction, if it is not then the method loops back to recheck the speed of the vehicle 1 in box 155 again and if the vehicle 1 is moving in a forward direction the method advances from box 155 to box 160 where a timer such as the timer T is started. The starting of the timer T constitutes the beginning of a drive cycle that will continue until the timer T is stopped in box 180.

From box 160 the method advances to box 165 where characteristic parameters of the vehicle during use are monitored and stored in, for example the temporary memory MTemp. In fact the monitoring of the various characteristic parameters required to build a common route commences as soon as the timer T is started. This step is used to begin to build the library of common routes for the current user if the user is known or for potential future use if a user not currently identified regularly uses the vehicle. The box 165 will also be entered from box 130 if the current route of the vehicle 1 is determined not be comparable to one of the stored common routes.

From box 165 the method advances to box 170 where, in this case, one of a number of stored standard routes is used to predict the short term future operation of the vehicle 1. The standard routes define the expected operation of the vehicle when it is operated in defined scenarios such as, for example, in city traffic, in urban traffic, on a motorway. By carrying out extensive research such standard routes can be produced which enable the short term prediction of future events to be used to assist with improving the operation of the functions F1 to F3 associated with the EPS 2.

From box 170 the method advances to box 175 that is a check for the occurrence of a Key-off event. If a key-off event has not occurred then the method returns to box 170.

Therefore, in the case where standard routes are used, a short term prediction of future vehicle operation can be provided so long as the current drive cycle continues as indicated by the arrow returning from box 175 back to box 170.

When a key-off event does occur the method advances from box 175 to box 180 where the timer T is stopped and then advances to box 185 where the just completed route is analyzed to see if a comparable route has occurred more than a predefined number (X) of times before. If the same route has been followed more than X times then it is stored in one of the memories M1, M2 as a common route for the current driver if the identity of the driver is known or stored in the temporary memory MTemp for future comparison purposes.

After box 185 the method advances via box 190 to box 199 where it ends.

Therefore in summary the invention proposes using characteristic vehicle parameters and/or user parameters to produce a number of common routes that can be used to predict future operation of the vehicle once it has been confirmed that a route currently being followed is comparable to one of the common routes.

The method could further comprise remembering where the vehicle last stopped and using this to speed up the recognition of whether the vehicle is on a common route. For example if the vehicle last stopped at a supermarket the next route is likely to be from the supermarket to home and so this common route can be checked first.

Similarly, if the last route was from work to home then the next route is likely to be from home back to work and so this could be checked first.

One of the advantages of using such a prediction method is that the future operation of the vehicle can be predicted automatically without the intervention of the user of the vehicle. A further advantage of using a CRPM is that the monitoring of the parameters both vehicle and user can be done using sensors that are often already present on the vehicle for other purposes and so the invention can be implemented in many cases with little additional cost. A further advantage is that a CRPM can be applied to vehicles having no navigation system or in countries where detailed digital road mapping has not taken place.

Yet one more advantage of the use of such a CRPM is that once it has been established that a vehicle is travelling on a common route the operation of the vehicle for the rest of the route can be predicted.

Figure 4:
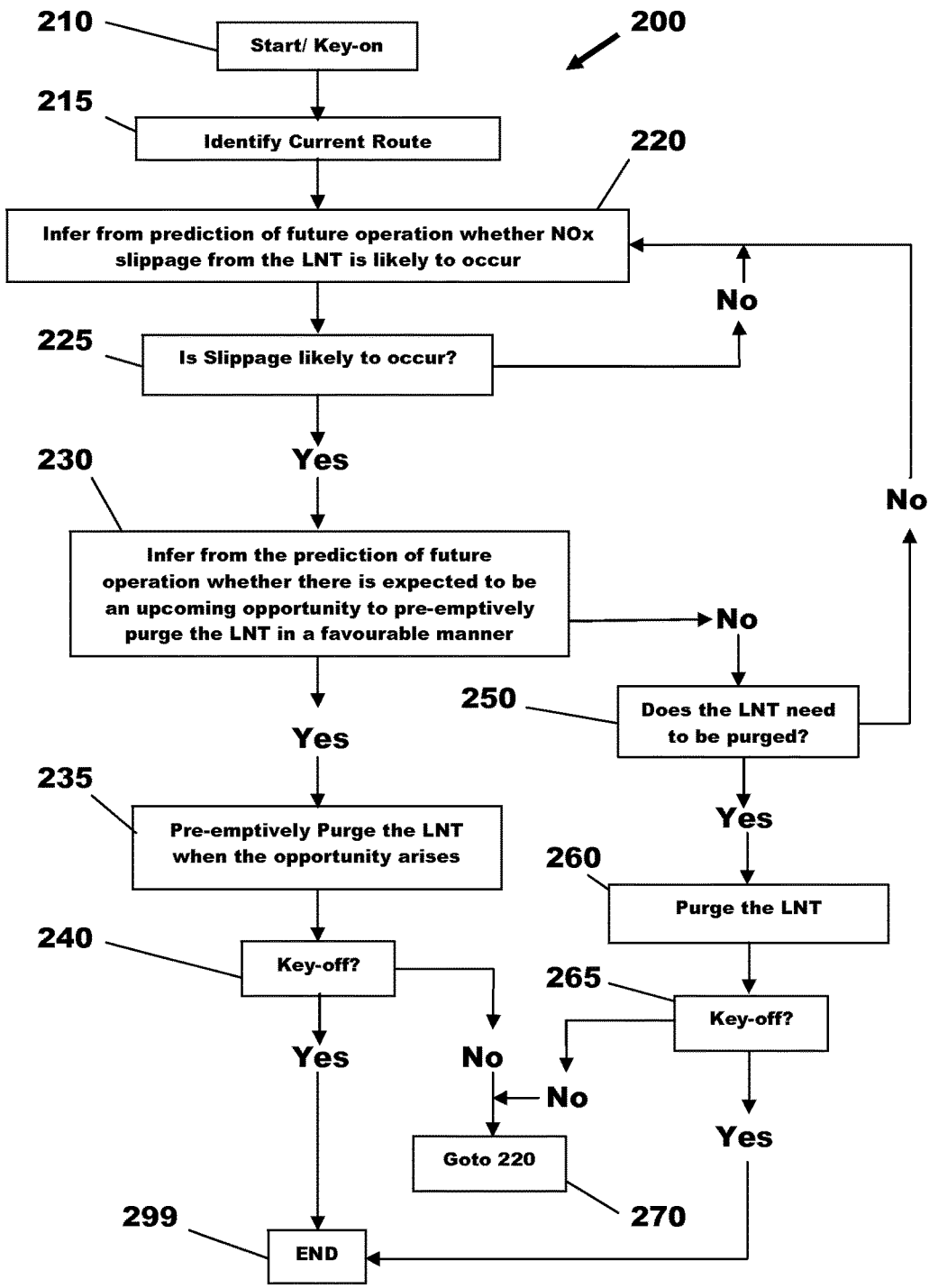
FIG. 4 is a flow chart of a method for pre-emptively regenerating a lean NOx trap according to a first aspect of the invention.

With particular reference to FIG. 4 there is shown a method of pre-emptively regenerating a lean NOx trap arranged to receive exhaust gas from a lean burn engine in accordance with this invention.

The method 200 starts in box 210 which is a key-on for a vehicle such as the vehicle 1 having the engine E operable in lean and rich modes to which the lean NOx trap (LNT), forming part of the aftertreatment system ATS for the engine E, is connected so as to receive exhaust gas therefrom.

From step 210 the method advances to box 215 where the route that the vehicle 1 is currently following is identified. This identification could be made by any suitable means but preferably is made using a technique forming part of a Common Route Predictor Method (CRPM) such as the CRPM previously described with reference to FIGS. 1 to 2B.

From box 215 the method advances to box 220 where a prediction of the future operation of the vehicle 1 and in particular the future operation of the engine E is used to infer or predict whether there is likely to be slippage of NOx from the LNT. This prediction could be made using any suitable technique but preferably is made using a CRPM such as the CRPM previously described with reference to FIGS. 1 to 2B.

Slippage of NOx from the LNT is more likely to occur as the LNT fills with NOx and when:

i. there is a drop in air/fuel ratio (Lambda $\lambda$); or
ii. there is an increase in exhaust gas temperature; or
iii. there is a large change in exhaust gas mass flow.

In box 220 an estimate is produced of the current level of NOx trapped in the LNT by, for example and without limitation, using a model for the NOx stored in the LNT since the last regeneration took place. This estimate is then used to determine whether slippage is likely to occur. It will be appreciated that as the level of NOx stored in the LNT increases the probability of slippage of NOx increase and that changes in factors i to iii required to produce slippage will reduce.

Therefore in box 220 it is checked from the prediction of future operation of the vehicle 1 whether the level of NOx trapped in the LNT is high enough that slippage could occur and also whether at least one of the engine operational factors i to iii is predicted to occur with sufficient magnitude during the current drive cycle.

The method then advances to box 225 where it is checked whether, based upon the current level of NOx in the LNT and at least one of the factors i to iii, slippage of NOx from the LNT is likely to occur. That is to say, the probability of slippage occurring is above a predefined level such as, for example 60%.

If, when checked in box 225, slippage of NOx from the LNT is expected to occur, the method advances from box 225 to box 230 otherwise it returns to box 220.

In box 230 it is checked whether from the prediction of future operation of the vehicle 1 there is expected to be in the near future an upcoming opportunity to regenerate the LNT in a favorable manner. It will be appreciated that this opportunity for regeneration must be present before the expected occurrence of the slippage of NOx from the LNT.

As before this prediction can use any suitable technique but preferably uses a CRPM.

In the case of this example the regeneration of the LNT is the purging of NOx from the LNT to prevent slippage of NOx. In the case of LNT purging it is required for the exhaust gas to be rich of stoichiometric and preferably with an air/fuel ratio Lambda ($\lambda$) less than one ($\lambda > 1$). It is also required to supply CO in order to reduce and release the stored NOx.

In order to do this in a most favorable manner, that is to say, when the fuel penalty is lowest, it is best to perform the purge when the air/fuel ratio is already low. A low air/fuel ratio occurs when the load on the engine is high and so there is a large torque demand from the engine E. It is preferable if the speed of the engine E is also low when the purge is being carried out because this will reduce the mass flow and hence gas velocity of the exhaust gas passing through the LNT thereby improving the conversion efficiency of the regeneration process.

Therefore in box 230 if it can be inferred from the prediction of future operation that there is an opportunity to purge the LNT in a favorable manner the method advances to box 235 where the LNT is purged when the favorable conditions occur. The favorable opportunity may be coincident with the slip-risk and so purging would occur at that time. It will be appreciated that the purging does not necessarily remove all the NOx trapped in the LNT because the length of time available in the current window of opportunity may be less than that required to remove substantially all of the trapped NOx, the purge will however significantly reduce or eliminate the probability of NOx slippage from the LNT occurring in the near future.

After purging is complete, the method advances from box 235 to box 240 to check whether a key-off event has occurred.

In box 240, if a key-off event has occurred, the method will end, as indicated by box 299, and otherwise it will return to box 220, as indicated by the box 270.

Referring back to box 230 if there are not expected to be any opportunities to purge the LNT in a favorable manner the method branches to box 250 to check whether the LNT needs to be purged. It will be appreciated that in box 220 there will be differing probabilities of the occurrence of slippage depending upon the level of NOx currently trapped in the LNT. In box 250 if the level of trapped NOx is above a predefined level or there is already an indication that slippage is beginning to occur then it will be necessary to purge the LNT even if this incurs a higher than desirable fuel penalty. However, if the probability of NOx slippage occurring is lower than, for example, 60% it is possible to defer purging and so the method returns to box 220 to recheck the probability of NOx slippage occurring.

However, if there is an urgent need to purge the LNT (probability>90%) then the method advances from box 250 to box 260 and purging of NOx from the LNT takes place even though this will incur a fuel penalty. As before, the purging may not remove all of the NOx trapped in the LNT just reduce it to a more acceptable level so as to significantly reduce the probability of NOx slippage from the LNT occurring in the near future.

After purging is completed the method advances from box 260 to box 265 to check whether a key-off event has occurred.

If a key-off event has occurred when checked in box 265, the method ends, as indicated by box 299, and otherwise it returns to box 220, as indicated by box 270.

With particular reference to FIG. 3 the electronic processing system 2 is arranged to schedule and control regeneration of the LNT forming part of the aftertreatment system ATS for the engine E.

The electronic processing system 2 is operable to use a prediction of future operation of the vehicle 1 to estimate the probability of NOx slippage from the LNT during the current drive cycle. If NOx slippage is expected to occur from the LNT in the current drive cycle, the electronic processing system 2 is operable to use the prediction of future operation of the vehicle 1 to infer whether there are any forthcoming opportunities to regenerate the LNT in a favorable manner before the slippage is predicted to occur. If such favorable opportunities are found to exist, the electronic processing system 2 is operable to schedule a regeneration of the LNT for the next favorable opportunity. It will be appreciated that the actual control of the purging could be performed by the electronic processing system 2 or by one or more other electronic processing systems with which the electronic processing system 2 communicates.

The electronic processing system 2 is in this case further operable to produce the prediction of future operation of the vehicle but in other embodiments a separate electronic processing system could be used to produce the prediction of future operation of the vehicle 1 and/or the engine E.

Preferably, a CRPM is used to produce the prediction of future operation of the vehicle 1 and/or the engine E.

Therefore in summary, by using a prediction of future operation of a vehicle and in particular the operation of an engine of a vehicle it is proposed to estimate whether NOx slippage from a lean NOx trap is likely to occur and also whether there is a opportunity to purge NOx from the lean NOx trap in a favorable manner before the slippage is predicted to occur so as to reduce or eliminate the probability of NOx slippage from occurring.

Although it is preferable to use a CRPM to produce the prediction of future operation of the vehicle/engine it would be possible to use other prediction methods.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

The invention claimed is:

1. A method of pre-emptively regenerating a lean NOx trap arranged to receive exhaust gas from a lean burn engine of a vehicle, the method comprising via an electronic processing system using a prediction of future operation of the vehicle to estimate a probability of NOx slippage from the lean NOx trap during a current drive cycle, and, if NOx slippage is expected to occur in the current drive cycle, use the prediction of future operation of the vehicle to infer whether there are any forthcoming opportunities to regenerate the lean NOx trap in a favorable manner before the slippage is predicted to occur and, if such favorable opportunities exist, schedule the regeneration of the lean NOx trap for a next favorable opportunity.

2. The method of claim 1, wherein the probability of whether NOx slippage is likely to occur is based upon a current level of NOx stored in the lean NOx trap and at least one engine operational factor.

3. The method of claim 2, wherein the probability of whether NOx slippage is likely to occur is based upon at least two engine operational factors.

4. The method of claim 2, wherein one engine operational factor is an expected drop in air/fuel ratio.

5. The method of claim 2, wherein one engine operational factor is an expected increase in exhaust gas temperature.

6. The method of claim 2, wherein one engine operational factor is an expected significant change in exhaust gas mass flow to the lean NOx trap.

7. The method of claim 1, wherein the regeneration of the lean NOX trap in a favorable manner is scheduled to occur when the prediction indicates that the engine is expected to be operating with a low air/fuel ratio.

8. The method of claim 7, wherein the engine is expected to be operating with a low air/fuel ratio when a load on the engine is high.

9. The method of claim 8, wherein the engine is expected to be operating with a low air/fuel ratio when the load on the engine is high and a speed of the engine is low.

10. The method of claim 1, wherein the prediction of future operation of the vehicle is obtained using a common route predictor method.

11. A vehicle having a lean burn engine, a lean NOx trap arranged to receive exhaust gas from the engine and an electronic processing system to control a regeneration of the lean NOx trap, wherein the electronic processing system is operable to use a prediction of future operation of the vehicle to estimate a probability of NOx slippage from the lean NOx trap during a current drive cycle, and, if NOx slippage is expected to occur in the current drive cycle, use the prediction of future operation of the vehicle to infer whether there are any forthcoming opportunities to regenerate the lean NOx trap in a favorable manner before the slippage is predicted to occur and, if such favorable opportunities exist, schedule the regeneration of the lean NOx trap for a next favorable opportunity.

12. The vehicle of claim 11, wherein the electronic processing system is further operable to produce the prediction of future operation of the vehicle.

13. The vehicle of claim 11, wherein the prediction of future operation of the vehicle is obtained using a common route predictor method.

14. A method of pre-emptively regenerating a lean NOx trap arranged to receive exhaust gas from a lean burn engine of a vehicle, the method comprising via an electronic processing system using a prediction of future operation of the vehicle to estimate a probability of NOx slippage from the lean NOx trap during a current drive cycle, and, if NOx slippage is expected to occur in the current drive cycle, use the prediction of future operation of the vehicle to infer whether there are any forthcoming opportunities to regenerate the lean NOx trap in a favorable manner before the slippage is predicted to occur and, if such favorable opportunities exist, schedule the regeneration of the lean NOx trap for a next favorable opportunity;
  wherein the probability of whether NOx slippage is likely to occur is based upon at least two engine operational factors, and
  wherein the prediction of future operation of the vehicle is obtained using a common route predictor method.

15. The method of claim 3, wherein one engine operational factor is an expected significant change in exhaust gas mass flow to the lean NOx trap.

16. The method of claim 3, wherein one engine operational factor is an expected increase in exhaust gas temperature.

17. The method of claim 2, wherein the regeneration of the lean NOX trap in a favorable manner is scheduled to occur when the prediction indicates that the engine is expected to be operating with a low air/fuel ratio.

18. The method of claim 3, wherein the regeneration of the lean NOX trap in a favorable manner is scheduled to occur when the prediction indicates that the engine is expected to be operating with a low air/fuel ratio.

19. The method of claim 14, wherein the regeneration of the lean NOX trap in a favorable manner is scheduled to occur when the prediction indicates that the engine is expected to be operating with a low air/fuel ratio.

20. The vehicle of claim 12, wherein the prediction of future operation of the vehicle is obtained using a common route predictor method.

* * * * *